United States Patent Office 3,267,554
Patented August 23, 1966

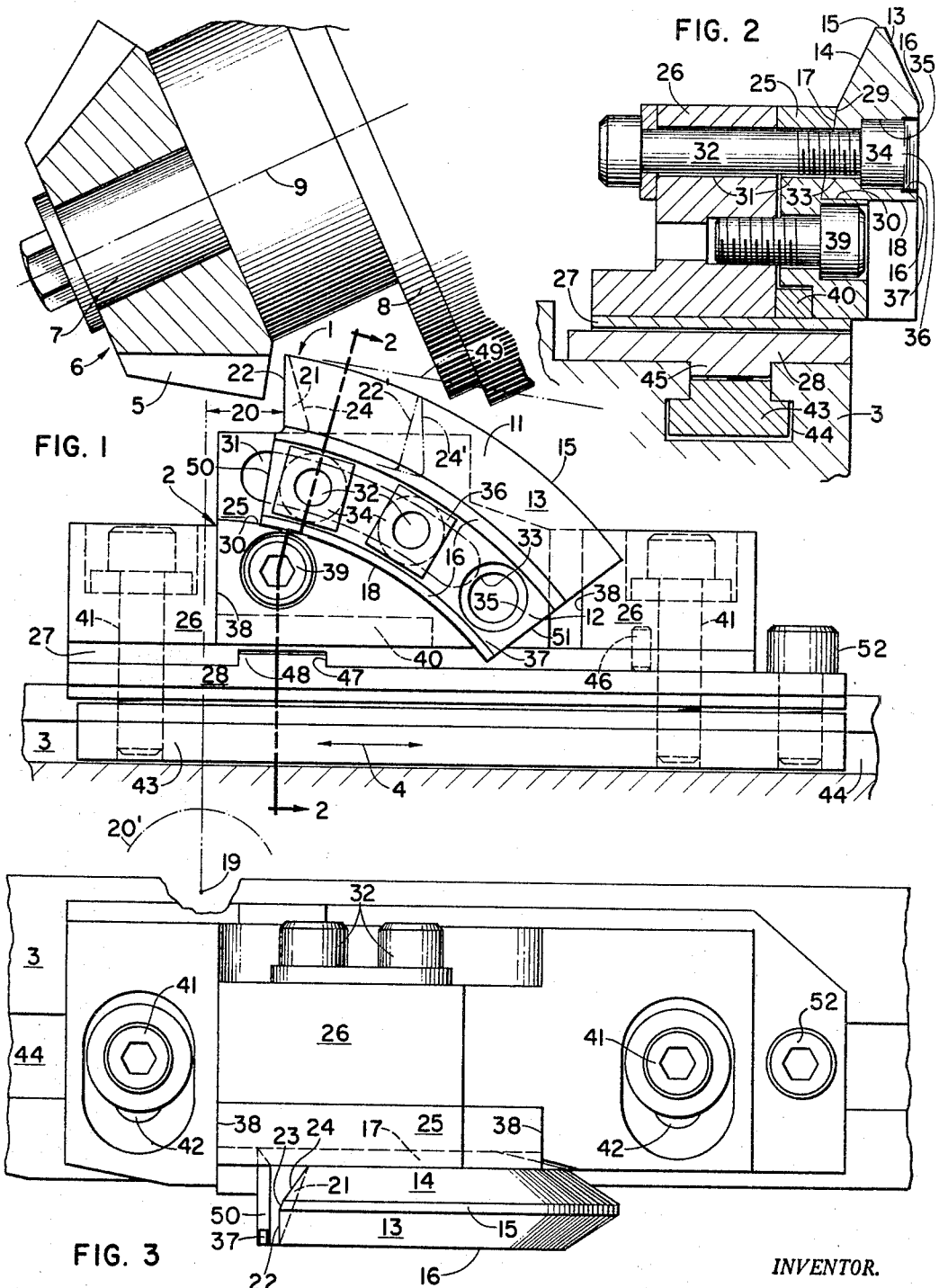

3,267,554
GEAR PLANING TOOL AND SUPPORT THEREFOR
Arthur B. Ryan, Victor, N.Y., assignor to The Gleason Works, Rochester, N.Y., a corporation of New York
Filed Aug. 11, 1964, Ser. No. 388,905
8 Claims. (Cl. 29—102)

The present invention relates to a reciprocatory planing tool and tool support for gear planing machines, particularly for machines of the kind employed for generating straight and skew bevel gears.

An object of the invention is a tool capable of being made with high precision at lot cost. A further object is a tool providing greater clearance than conventional tools back of its cutting edge, to thereby permit the workpiece-supporting structure to be positioned closer to the cutting zone without interfering with the tools. A still further object is a tool having greater resistance to deflection in response to side cutting loads.

A tool according to the invention comprises an integral cutting portion and shank of arcuate form, constituting a segment of a ring, with the tip and side faces of the cutting portion and the side and bottom faces of the shank being surfaces of revolution about an axis perpendicular to the intended cutting direction, the cutting portion extending radially outward from the shank.

The foregoing and other objects and advantages will appear from the following description of the preferred embodiment of the invention shown in the accompanying drawings, wherein:

FIG. 1 is a side view of the tool and the support therefor in cutting relationship to a work gear and work supporting means;

FIG. 2 is a cross section in the several planes indicated by section line 2—2 in FIG. 1; and, FIG. 3 is a view taken at right angles to FIGS. 1 and 2.

The cutting tool 1 is mounted by means of multipart tool holder 2 on a slide 3 which is reciprocable in the direction of arrow 4 to traverse the tool across a tooth 5 of a bevel gear 6. The gear is supported by means of a suitable work holder 7 on work spindle 8, which is rotatable about axis 9 in the work head of the machine. The machine may be a bevel gear generator of the kind disclosed in patent application Serial No. 354,048, filed March 23, 1964, by E. J. Hunkeler. As there disclosed the path of reciprocation of the tool slide 3 may be slightly curved to crown the teeth from end to end, and during each non-cutting return stroke, to the right in FIG. 1, the slide is withdrawn slightly from the work gear to prevent the tool from scraping; but insofar as concerns the present invention the path of tool reciprocation may be regarded as rectilinear. Also as disclosed in said patent application, two such tool mechanisms are provided on the machine, the tools being arranged in pairs of opposite hand to cut on opposite sides of the same gear tooth.

The tool 1 comprises integral cutting portion 11 and shank 12, both of arcuate form. Cutting portion 11 has convex conical side faces 13 and 14 and convex cylindrical tip face 15, while shank 12 has plane side face 16, convex conical side face 17 and concave cylindrical base surface 18. All of these faces 13–18 are surfaces of revolution about an axis 19 which is perpendicular to the tool stroking direction 4. The front or cutting face 21 of the cutting portion is sharpened to provide an acute side cutting edge 22 at the front of side face 13, an acute tip cutting edge 23 at the front of tip face 15, and an obtuse edge 24 which is non-cutting during finish cutting of a gear but which may cut during an initial tooth slotting operation. The side cutting edge 22 is disposed in a plane perpendicular to the stroking direction 4 and at such distance 20 back of the pivot axis 19 that the parts of surfaces 13, 14 and 15 immediately behind edges 22, 24, and 23 have a suitable clearance angle to the work surfaces cut by these edges.

The tool holder 2 comprises a tool mounting plate 25, a tool block 26, a tool block plate 27 and a tool block key 28. Plate 25 has concave conical surface 29 and convex cylindrical surface 30 which are respectively complementary to and which seat surfaces 17 and 18 of the tool. It also has an arcuate slot 31 coaxial of axis 19 and aligned with a like arcuate slot 31 in block 26 for receiving headed tool holding screws 32 which extend through bores 33 in tool shank 12. Nuts 34 threaded to screws 32 have cylindrical portions which seat in counterbores 35 in the shank and squared ends 36 held against rotation by seating in an arcuate groove 37 in face 16. Plate 25 has plane parallel front and rear end faces and fits snugly between parallel plane surfaces 38 of block 26, these surfaces 38 being perpendicular to stroking direction 4. The plate is secured in this position to the block 26 by a screw 39. By exchange of a shim bar 40, which is interposed between plate 25 and block 26, for a bar 40 of slightly greater or lesser thickness, the plate and the tool may be slightly tilted, in effect about an axis parallel to axis 19, to change in pressure angle of edge 22, for the purpose explained in Patent No. 1,587,709, granted to S. H. Earl on June 8, 1926.

The tool block 26 is secured to slide 3 by headed screws 41 which extend through elongated transverse openings 42 in the block and are screw threaded into a retainer 43 disposed in a T-slot 44 in the slide 3. The tool block key 28 has a tongue 45 fitting this slot, which extends in the stroking direction 4, so that upon loosening of screws 41 the entire tool and holder assembly can be adjusted in that direction along the slide. The tool block plate 27 is dowelled to the tool block 26, one dowel being shown at 46, and has a key slot 47, perpendicular to slot 44, receiving tongue 48 of the key 28. The key arrangement guides the tool block for lateral adjustment of the tool when the screws 41 are loosened. A screw 52 extending through key 28 and threaded into retainer 43 may be tightened to hold the tool and tool block assembly against movement along slot 44 when screws 41 are loosened to adjust the assembly laterally, along guide tongue 48.

The tool is resharpened by grinding back face 21 in such manner that the side cutting edge will lie in a plane perpendicular to stroking direction 4 when the tool is advanced along arcuate seat 29, 30 to bring the edge to distance 20 back of axis 19, this advance preferably being accomplished with the aid of a gaging fixture, not shown. For example, when the cutting face of the tool is sharpened back to bring the side cutting edges to the positions indicated by broken lines 22', 24', the tool is restored to its original cutting position by advancing edge 22' along the tool mounting plate to said distance 20 from axis 19. Considered in another way, the sharpening is preferably so conducted that the cutting edge 22 (or 22') substantially coincides with a line tangent to a cylinder 20' of radius 20, whose axis is 19.

As may be seen from FIG. 1, the arcuate tool has an advantage over conventional straight tools in that back of its cutting edge it recedes more rapidly from the work spindle 8 of the machine, allowing the work gear 6 to be supported more closely to the end of the spindle 8 and its housing. Broken line 49, drawn tangent to tool tip face 15 at the intersection therewith of edge 22, can be considered to represent the tip edge of a conventional straight tool; and it will be seen that this line intersects the spindle. Furthermore by reason of its curved form tool 1 has a greater extent than a conventional tool in the direction of the depth of the tooth slot being cut, i.e. vertically in FIG. 1, to better resist lateral deflection under loads against side cutting edge 22.

The arcuate tool 1 may be formed economically and accurately as a complete ring, which after final machining of surfaces of revolution 13–18, whether by turning, milling, grinding or otherwise, is severed into segments by radial cuts, to thereby produce a number of like tools. These radial cuts form the front and rear end faces 50 and 51. The particular tool illustrated was produced by severing a ring into eight equal segments. Either end of the tool may be sharpened for cutting, so that both right and left hand tools may be produced from the same ring.

Having now described the preferred embodiment of my invention, what I claim is:

1. A reciprocatory planing tool for gear cutting comprising an integral cutting portion and shank of arcuate form, constituting a segment of a ring, with the tip and side faces of the cutting portion and the sides and bottom faces of the shank being surfaces of revolution about an axis perpendicular to the intended cutting direction, the cutting portion extending radially outward from the shank and having a cutting edge at the front, considered in the direction of cutting, of one side face thereof, said edge being in a plane perpendicular to said direction and spaced rearwardly from said axis.

2. A tool according to claim 1 in which one of said side faces of the shank is a convex conical surface.

3. A tool according to claim 2 in which the other one of said faces of the shank is plane.

4. A tool according to claim 3 in which said cutting edge is at the front of the side face of said cutting portion which lies on the same side of the tool as the plane side face of the holding portion.

5. A tool according to claim 2 in which the bottom face of the shank is a concave cylindrical surface.

6. A tool according to claim 2 in which said shank has a plurality of bores for holding screws extending therethrough, said bores being parallel to said axis and equally spaced therefrom.

7. A tool according to claim 6 in combination with a tool holder having an arcuate groove with a concave conical surface and a convex cylindrical surface which are complementary to and seat said convex conical surface and said concave conical surface, respectively, and said holder having an arcuate holding screw receiving slot concentric with said arcuate and cylindrical surfaces and at the same distance as said bores from their common axis.

8. A tool and tool holder according to claim 7 in combinaton with a reciprocatory tool slide, means for adjusting said tool holder on said slide in (a) the direction of slide reciprocation, (b) perpendicularly to said direction, in substantially the direction of said axis, and (c) angularly about an axis parallel to said direction.

References Cited by the Examiner
UNITED STATES PATENTS

| | | | |
|---|---|---|---|
| 1,587,709 | 6/1926 | Earl | 90—6 |
| 2,181,137 | 11/1939 | Lambright | 29—102 |
| 2,895,384 | 7/1959 | Baxter et al. | 90—6 |

WILLIAM W. DYER, Jr., *Primary Examiner.*

L. VLACHOS, *Assistant Examiner.*